Figure 1:
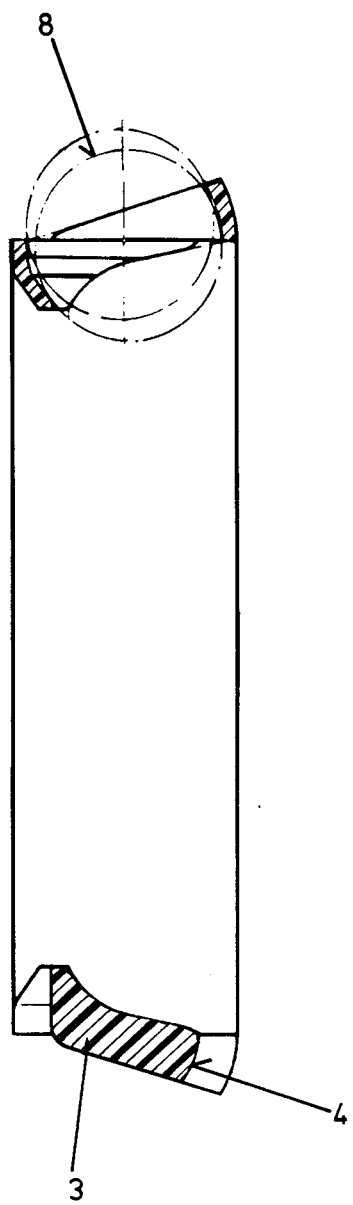

United States Patent [19]

Bonengel et al.

[11] Patent Number: 4,560,291
[45] Date of Patent: Dec. 24, 1985

[54] CAGE FOR BALL BEARINGS, ESPECIALLY FOR INCLINED BALL BEARINGS

[75] Inventors: Roland Bonengel, Geldersheim; Herbert Dobhan, Bergrheinfeld; Manfred Brandenstein, Eussenheim; Ludwig Edelmann, Premich; Horst M. Ernst, Eltingshausen; Helmuth Kregler, Schweinfurt; Anton Marx, Sulzthal; Gunter Neder, Schweinfurt; Elmar Mause, Schweinfurt; Armin Olschewski, Schweinfurt; Rainer Schürger, Schwanfeld; Robert Stolz, Schweinfurt, all of Fed. Rep. of Germany

[73] Assignee: SKF Kugellagerfabriken GmbH, Schweinfurt, Fed. Rep. of Germany

[21] Appl. No.: 564,836

[22] Filed: Dec. 23, 1983

[30] Foreign Application Priority Data

Dec. 24, 1982 [DE] Fed. Rep. of Germany ....... 3247948

[51] Int. Cl.⁴ ............................................. F16C 33/38
[52] U.S. Cl. ................................................... 384/533
[58] Field of Search ................... 308/201, 189 A, 188, 308/190, 189 R; 384/523, 530, 533, 513, 514, 516, 490

[56] References Cited

U.S. PATENT DOCUMENTS

| 821,057 | 5/1906 | Peterson | 308/189.1 |
| 1,199,182 | 9/1916 | Hess | 308/201 |
| 2,325,623 | 8/1943 | Murtagh et al. | 308/189 R |
| 3,008,559 | 11/1961 | Forster | 308/201 X |
| 4,225,199 | 9/1980 | Earsley | 308/201 |
| 4,277,116 | 7/1981 | Lauterbach | 384/530 |
| 4,330,160 | 5/1982 | Stolz et al. | 308/201 |

FOREIGN PATENT DOCUMENTS

| 1750106 | 1/1973 | Fed. Rep. of Germany . | |
| 2343749 | 4/1975 | Fed. Rep. of Germany . | |
| 536531 | 12/1955 | Italy | 308/201 |
| 1186856 | 4/1970 | United Kingdom . | |

Primary Examiner—Stuart S. Levy
Assistant Examiner—Lynn M. Sohacki
Attorney, Agent, or Firm—Yuter, Rosen & Dainow

[57] ABSTRACT

A cage for ball bearings consists of two side rings connected together by webs, and having ball pockets with ball pockets having curved partial surfaces inside and outside of the pitch circle and displaced from one another in the axial direction. In this arrangement the rubbing between the walls of the cage pockets and the balls is very small and free space is provided for receiving a lubricant. The pocket walls of the cage sections lying in the region of one or the other of the side rings has several radially-overlying zones, with conical surfaces, the conical surfaces being arranged at different inclinations to the bearing axis.

8 Claims, 5 Drawing Figures

CAGE FOR BALL BEARINGS, ESPECIALLY FOR INCLINED BALL BEARINGS

This invention relates to a cage for ball bearings, especially for inclined ball bearings, which consists of two side rings connected together by webs and having cage pockets sections with curved partial surfaces inside and outside of the pitch circle and displaced from one another in the axial direction.

This type of cage is disclosed, for example, in DE-AS No. 1,750,106. The rubbing between the walls of the cage pockets and the balls is relatively large in this known arrangement. In a further disadvantage of this arrangement, no free space is provided in the cage for the reception of lubricant. In addition the balls contact corresponding spherical surfaces of the cage pocket on one edge, so that the lubricant is easily scraped from the sharp edges of the pocket walls and the radial pocket clearance cannot be accurately determined.

It is the object of this invention to provide a cage for ball bearings, especially for inclined ball bearings, with cage pockets which have sections with curved partial surfaces inside and outside of the pitch circle which are separated from one another in the axial direction, and in which the rubbing between the walls of the cage pockets and the balls is very small, free space is provided for receiving the lubricant, and the radial pocket clearance can be accurately determined.

Briefly stated, in accordance with the invention, this object is solved by providing a cage wherein the pocket walls of the cage sections in the region of one and/or the other side ring have several radially-overlying zones with conical surfaces, the conical surfaces being inclined at different angles to the bearing axis. The cage may be economically produced, for example of a plastic material, in a casting or injection-molding die with axially movable slides.

In accordance with a further feature of the invention the radius of the pocket walls of the cage sections in the region of one side surface are larger than the radius of the ball and the center point of the pocket wall is displaced in the axial direction toward the other ring and in the radial direction inwardly toward the cage axis with respect to the center point of the ball, and the pocket walls of the cage sections in the region of the other side ring are provided with a zone with one cylindrical surface and two zones with conical surface. The conical surface of one zone is inclined at a greater angle to the bearing axis than the other zone with a conical surface. The conical surfaces are prism-shaped, and enclose an obtuse angle. Cages with this type of cage pockets have very small friction.

Finally, it is advantageous to form a web to be concave in the axial direction, and/or provide the side rings with recesses extending into their outer end surfaces, so that the wall thicknesses of the side rings is about the same thickness and approximately the same thickness as the cage webs. This results in the production of a flexible cage which is especially suitable for moment-loaded bearings.

In order that the invention will be more clearly understood, it will now be disclosed in greater detail with reference to the accompanying drawings, wherein:

FIG. 1. is a cross section view of a plastic cage for an inclined ball bearing, in accordance with the invention, the upper half of the figure illustrating a cage pocket and the lower half of the figure illustrating a web between cage pocket.

Figure 2:
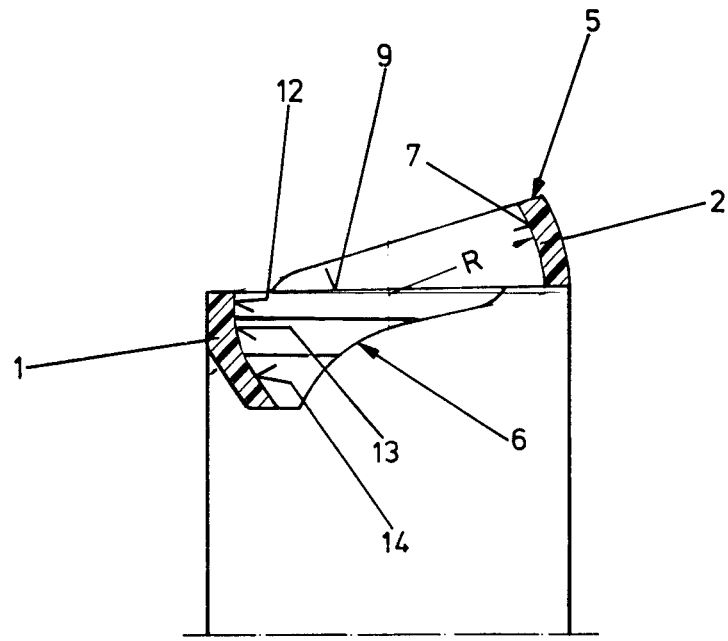
Figure 3:
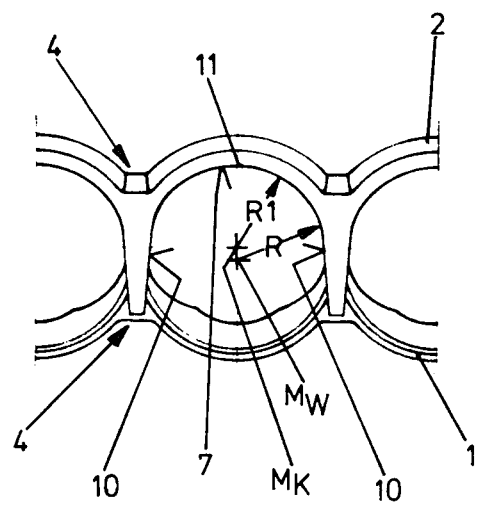
Figure 4:
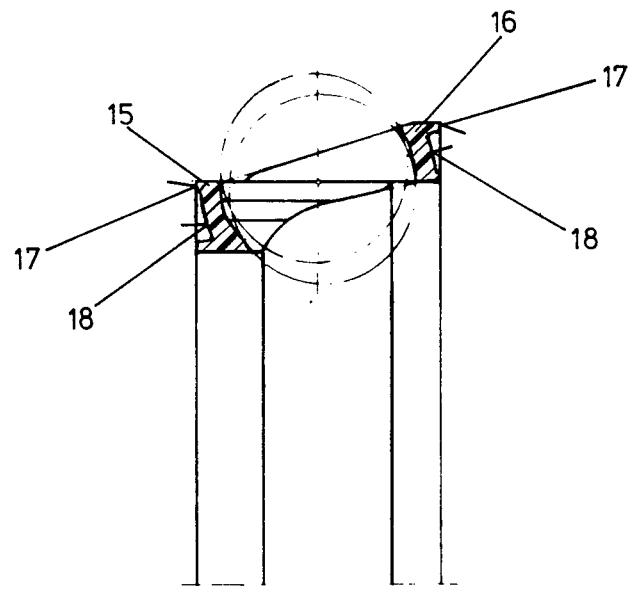
Figure 5:
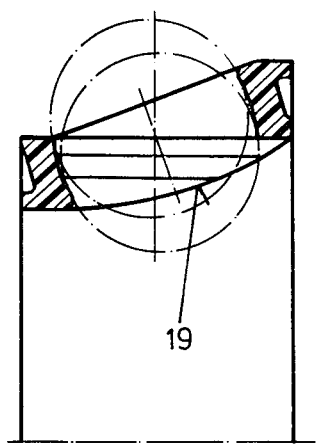

FIG. 2. is an enlarged cross section view of a cage pocket;

FIG. 3. is a partial plan view of the cage of FIG. 1;

FIG. 4. is a cross section view of a cage pocket in accordance with a further embodiment of the invention;

FIG. 5. is a cross section view of a further embodiment of the cage pocket of a cage in accordance with the invention.

The plastic cage for an inclined ball bearing as illustrated in FIGS. 1–3 may be produced with axially removable slides (not shown) in a casting or injection molding die and is comprised of two side rings 1,2 interconnected with one another by webs 3. The side rings 1,2 have recesses 4 extending from the end face, so that a bending elastic cage is produced which, for example, may be of a glass fiber reinforced plastic material. This cage is especially suitable for moment loaded bearings, since it is stretchable as a result of the small equal wall thicknesses of the side rings 1 and 2, which correspond approximately to the thickness of the webs 3, and can absorb different ball movements inside of the cage by deformation of the thin walls.

The cage pockets are separated to define an outer cage section 5 outside of the pitch circle (i.e. the circle defined by the centers of the balls, as seen in FIG. 1) and an inner cage section 6 inside of the pitch circle, as a result of the use of a casting or injection molding die having axial removable slides. The pocket wall 7 of the cage section 5 is curved to have a radius R that is substantially larger than the radius R1 of the ball. The center of curvature Mw of pocket wall 7 is displaced in the axial direction toward the side ring 1 and in the radial direction inwardly toward the cage axis, with respect to the center point Mk of the ball 8, and in the radial direction inwardly toward the cage axis. The upper and lower cage sections 5,6 are separated from one another by an edge 9 which occurs at the separation line of the axial slides (not illustrated). The web walls 10 on the radial outer side of the edge 9 of the cage pockets are cylindrical in the axial direction and extend approximately parallel to one another so that the distance between them is slightly greater than the ball diameter. The balls 8 contact the pocket wall 7 at a point 11 as a result of this formation of the outer pocket sections, the point 11 being the point at which the balls have the least circumferential speed, so that the cage wear is held to a minimum.

The pocket walls of the lower cage section 6 have one zone with a cylindrical surface 12 and two zones with conical surfaces 13, 14, each of the zones being inclined at a different angle to the bearing axis. The cylindrical surface 12 of the upper zone extends at a greater angle to the bearing axis than the conical surface 13 of the central zone, and the conical surface 13 extends at a greater angle to the bearing axis than the conical surface 14, so that the conical surfaces 13 and 14 define prism-shaped contact surfaces for the balls 8, and enclose an obtuse angle.

The open distance from the cylindrical surface 12 to the upper edge of the pocket wall 7 is smaller than the ball diameter at the center region of the cage pocket in the axial direction. As a result the balls 8 must be pressed in the cage pockets with elastic stretching of the pocket walls, so that when the balls are assembled in the cage they are insured against falling radially out of the cage. The conical surface 13 of the central zone extends along the inner surface of the side ring 1 and the web 3 such that in the circumferential direction of the cage a correspondingly wider web results between the ball pockets. The conical surface 14 of the lower zone serves to radially guide the cage.

The balls 8 do not contact one edge, as in conventional conical cage pockets, but contact both surfaces 13, 14 inside of the pitch circle. The radial pocket clearance can be accurately determined by means of the arrangement of the surfaces 14, and the enlargement of the radial clearance by wear is greatly impeded. The lubricant is not stripped off of the outer surface of the balls in this arrangement of the cage pockets. Furthermore, free spaces are provided for example between the balls 8 and the pocket walls 7, 10 of the cage, which serve as lubricant reservoirs. There are only very small rubbing surfaces due to the prismatic guiding of the balls 8 in the cage section 6 and the single point guiding of the balls 8 in the outer cage section 5, so that the wear between the cage and the ball 8 is very minimum. The webs of the lower cage section 6 start in the region of the center of the cage and extend first outwardly for the entire height of the cage side ring 1, so that the balls 8 do not contact surfaces which could result in stress concentration by material build-up and would thus be susceptible to crack formation. The cage in accordance with the invention has a minimum weight and thus requires only a short curing time in the casting or injection-molding dies as a result of its minimum mass.

The cage illustrated in FIG. 4 has cage pockets as above described. It differs from the above-described embodiment only in the outer form of the side rings 15 and 16. These side rings are provided with encircling axial-extending grooves 18 extending into the end faces 17.

The cage illustrated in FIG. 5 also has cage pockets essentially as shown in FIGS. 1-3. The webs in this embodiment of the invention, however, are convex curved in the cage bore.

The above described embodiments are only examples of the cage in accordance with the invention. Modifications in the construction are possible within the scope of the invention. For example, the pocket walls of the cage sections 5 can be formed in the same manner as the pocket walls of the cage section 6, so that the cylindrical surfaces 12 extend radially in both directions from the pitch circle. It is also possible in accordance with the invention to form the pocket walls of the lower cage section 6 with spherical surfaces and to provide the upper cage sections 5 with cylindrical and conical surfaces corresponding to the cylindrical surface 12 and conical surfaces 13 and 14 of the embodiment of the invention of FIGS. 1-3.

What is claimed is:

1. In a cage for a ball bearing comprising first and second side rings interconnected by a plurality of webs to define therewith a plurality of pockets distributed circumferentially around the cage for receiving balls of a given diameter, the pockets having first sections radially outwardly of the pitch circle defined by the centers of the balls and second sections radially inward of said pitch circle, the first sections being displaced axially of the cage with respect to the second sections, one of said first and second sections having a plurality of zones at different radial distances from the axis of said cage with different inclinations to said axis, with the one of said zones most remote from said pitch circle comprising a conical surface; the improvement wherein the other of said first and second sections have curved walls facing the respective said pockets with radii greater than the radii of the balls in said pockets, the centers of curvature of said curved walls being on the opposite side of pitch circle as the respective said other sections and being closer to said one of said first and second sections than said centers of said balls, in the axial directions of said cage, at least two of said zones of said one of said first and second sections being conical, said one of said zones being positioned to guide the respective balls in the radial direction of said cage.

2. The cage of claim 1 wherein said second sections of said pockets comprise said one of said first and second sections, and said first sections of said pockets comprise said others of said first and second pockets.

3. The cage of claim 2 wherein said one of said zones is inclined to axis of said cage at a greater angle than another of said plurality of zones.

4. The cage of claim 2 wherein said two of said zones enclose an obtuse angle, and define a prism-shaped cross section of said cage.

5. The cage of claim 2 wherein the webs define parts of said first and second sections of said pockets, the web portion of said second sections having one axial end with respect to the cage axis in region of the axial center of the cage, said web portion extending the radially inwardly and axially toward the respective pockets and having a radial dimension inwardly of said pitch circle substantially equal to that of the respective cage pocket.

6. The cage of claim 2 wherein the profile of the web in the axial direction of the cage in the cage bore, is concave-curved.

7. The cage of claim 2 wherein the profile of the web in the axial direction of the cage in the cage bore is convex-curved.

8. The cage of claim 1 wherein said side rings have recesses extending from the axially outer facing surfaces thereof and the wall thickness of the side rings in the axial direction of the cage is substantially as thick as the cage webs in the circumferential direction of the cage.

* * * * *